(12) United States Patent
Lin

(10) Patent No.: US 11,305,844 B2
(45) Date of Patent: Apr. 19, 2022

(54) MOORING ROPE

(71) Applicant: YOKE INDUSTRIAL CORP., Taichung (TW)

(72) Inventor: Thomas Lin, Hemei Township (TW)

(73) Assignee: YOKE INDUSTRIAL CORP., Taichung (TW)

(*) Notice: Subject to any disclaimer, the term of this patent is extended or adjusted under 35 U.S.C. 154(b) by 428 days.

(21) Appl. No.: 16/233,579

(22) Filed: Dec. 27, 2018

(65) Prior Publication Data
US 2020/0207445 A1    Jul. 2, 2020

(51) Int. Cl.
*B63B 21/20* (2006.01)
*G06K 19/07* (2006.01)
*B63B 21/00* (2006.01)

(52) U.S. Cl.
CPC ........ *B63B 21/20* (2013.01); *B63B 2021/003* (2013.01); *B63B 2021/203* (2013.01); *G06K 19/0723* (2013.01)

(58) Field of Classification Search
CPC .............. B63B 21/20; B63B 2021/003; B63B 2021/203
See application file for complete search history.

(56) References Cited

U.S. PATENT DOCUMENTS

| | | | | |
|---|---|---|---|---|
| 4,139,956 A | * | 2/1979 | Sharrow | G09F 3/14 40/316 |
| 5,699,657 A | * | 12/1997 | Paulson | B65H 69/06 28/142 |
| 5,699,748 A | * | 12/1997 | Linskey, Jr. | B63B 21/54 114/221 R |
| 6,550,409 B1 | * | 4/2003 | Smith | B63B 21/12 114/221 R |
| 10,896,364 B1 | * | 1/2021 | Hong | G06K 19/0723 |
| 2005/0226584 A1 | * | 10/2005 | Williams | G01L 5/105 385/130 |
| 2008/0156245 A1 | * | 7/2008 | Duarte | B63B 21/54 114/230.15 |
| 2010/0327710 A1 | * | 12/2010 | Kolton | G06K 19/041 312/223.1 |
| 2011/0174885 A1 | * | 7/2011 | Hansen | G06K 19/07728 235/492 |

(Continued)

FOREIGN PATENT DOCUMENTS

| | | |
|---|---|---|
| CN | 209194225 | 8/2019 |
| DE | 202019100060 U1 | 3/2019 |

(Continued)

*Primary Examiner* — S. Joseph Morano
*Assistant Examiner* — Jovon E Hayes
(74) *Attorney, Agent, or Firm* — Tracy M Heims; Apex Juris, pllc.

(57) ABSTRACT

A mooring rope includes a rope body, a fixing sleeve, and a data carrier. The rope body has two fixed sections and a rope loop between the fixed sections. The fixing sleeve combines the two fixed segments. The data carrier includes a connecting piece, a main body, and a tag member. The connecting piece is arranged in the fixing sleeve. The main body is connected to the connecting piece. The tag member is mounted on the main body. The tag member stores information for an external data reader to read in a non-contacting manner. As such, the data carrier can be firmly fixed on the mooring rope.

7 Claims, 5 Drawing Sheets

(56) References Cited

U.S. PATENT DOCUMENTS

| | | | | |
|---|---|---|---|---|
| 2013/0247337 A1* | 9/2013 | Zimmel | ................. | B65C 7/001 24/367.1 |
| 2018/0149137 A1* | 5/2018 | Nordstrom | ................ | F03D 5/00 |
| 2020/0207445 A1* | 7/2020 | Lin | ......................... | B63B 21/20 |

FOREIGN PATENT DOCUMENTS

| | | |
|---|---|---|
| JP | 3220091 | 2/2019 |
| TW | M575070 | 3/2019 |

\* cited by examiner

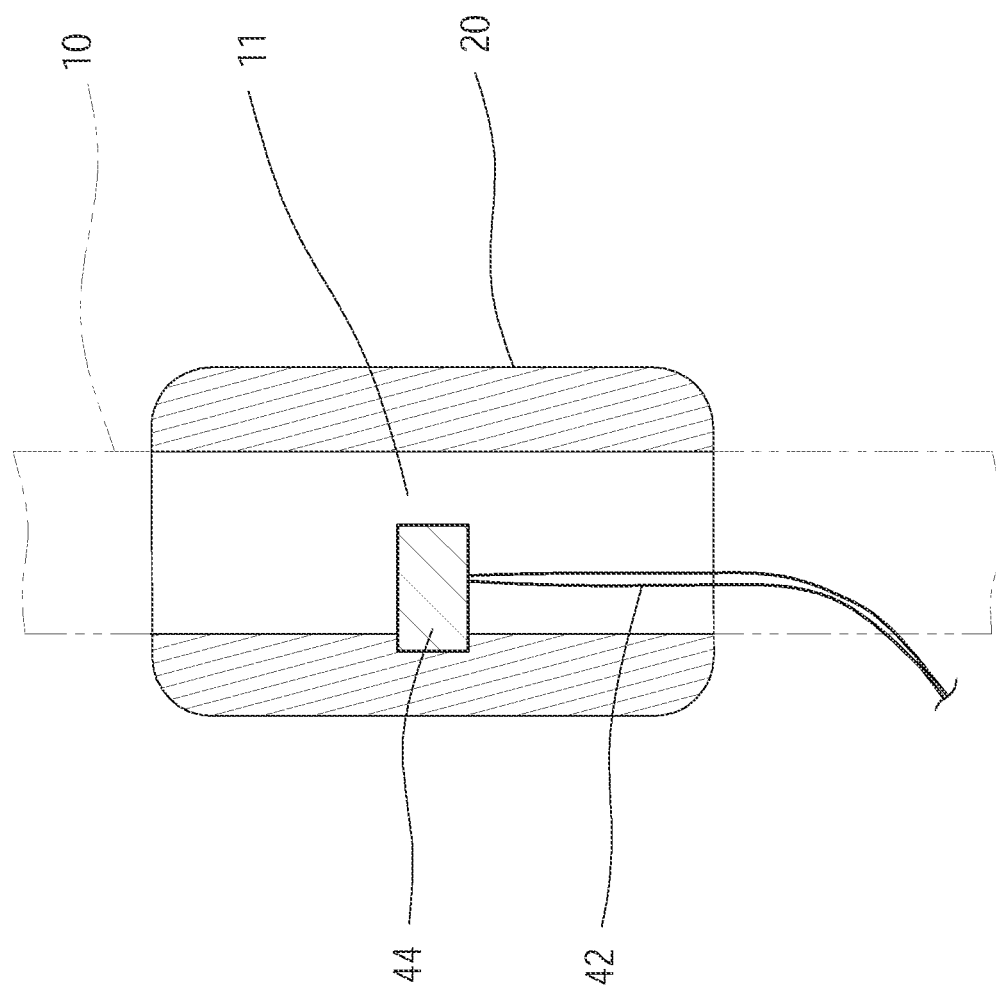

MOORING ROPE

BACKGROUND OF THE INVENTION

Technical Field

The present disclosure is related to a mooring rope, and, more particularly, to a mooring rope connected with a data carrier.

Description of Related Art

With the increasing maturity of intellectual recognition, the inductive data carrier is gradually applied to a variety of products to confirm the specifications or safety verification data of the products. The most widely used inductive data carrier is the Radio Frequency Identification tag (RFID tag), which can store much product-related information, such as model, size, manufacturer, date of manufacture, service life, maintenance history, safety verification data, etc. that may be received or transmitted by the antenna or coil. In recent years, the application of RFID tag in daily life has been dramatically increased, for example, in recording attendance, managing luggage, and tracking mail, etc.

The data carrier used with a mooring rope is generally hung thereon for convenient carry or connection with an object. The unrestricted hanging permits the data carrier to sway with movement of the product or the user holding it During such movement the data carrier potentially collides with or catches on the surrounding articles. As a result, the data carrier may be damaged and the received information disrupted.

Thus, drawbacks of the conventional mooring rope sleeve with data carrier leave room for improvement.

BRIEF SUMMARY OF THE INVENTION

In view of the above, the purpose of the present disclosure is to provide a mooring rope having a data carrier which may be fixed firmly thereon and not drop therefrom.

The present disclosure provides a mooring rope including a rope body, a fixing sleeve, and a data carrier. The rope body has two fixed sections and a rope loop between the two fixed sections. The fixing sleeve combines the two fixed sections. The data carrier includes a connecting piece, a main body, and a tag member. The connecting piece is arranged in the fixing sleeve. The main body is connected to the connecting piece. The tag member is mounted on the main body and stores information for an external data reader to read in a non-contacting manner The advantage of the present disclosure is that the main body may be fixed firmly on the rope body without dropping therefrom easily.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which

FIG. 5 is an enlarged lateral view showing the fixed segment, thread end, and the connecting thread arranged in the fixing sleeve according to the third embodiment.

DETAILED DESCRIPTION OF THE INVENTION

Figure 1:
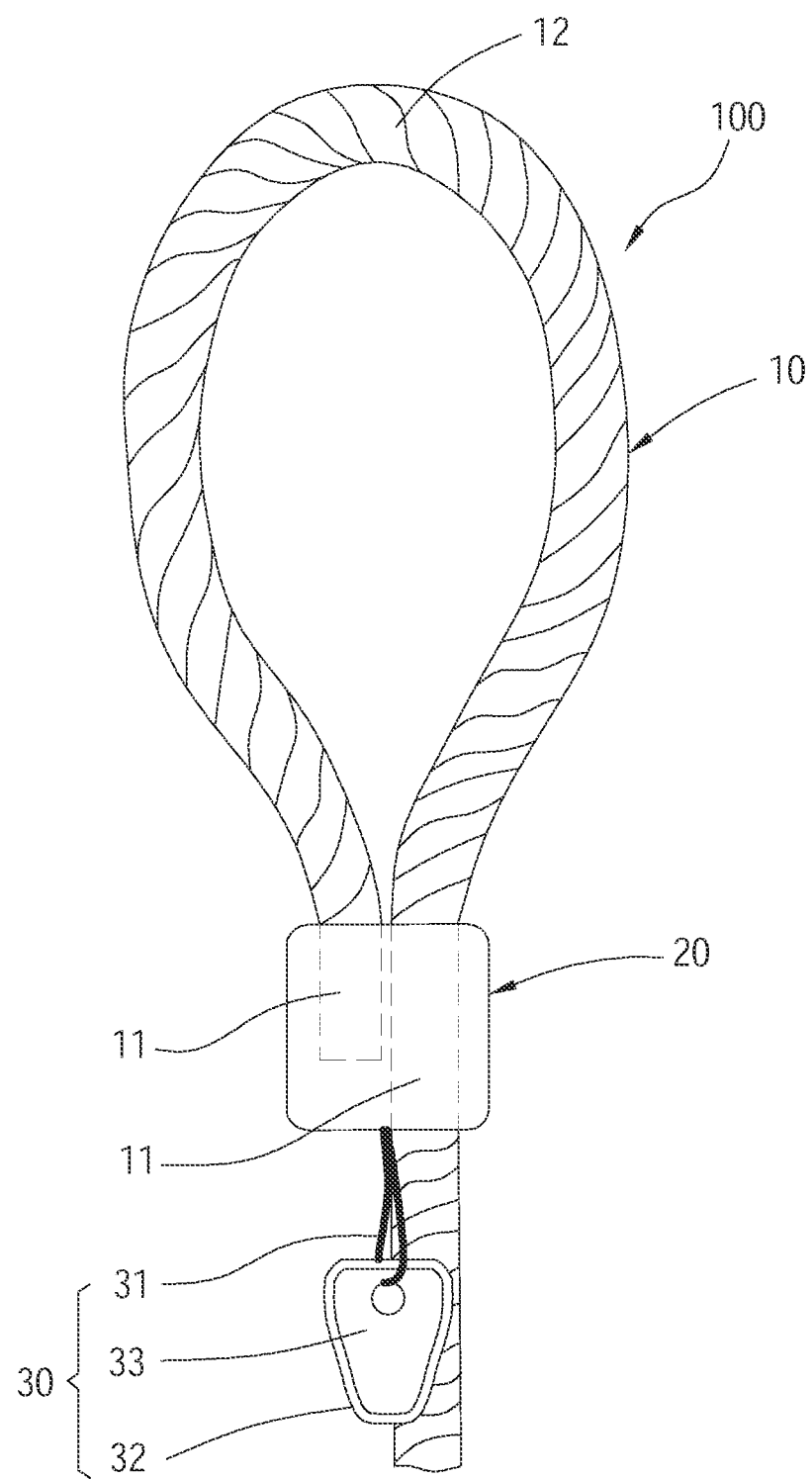
FIG. 1 is a schematic view showing the mooring rope according to a first embodiment of the present disclosure.
Figure 2:
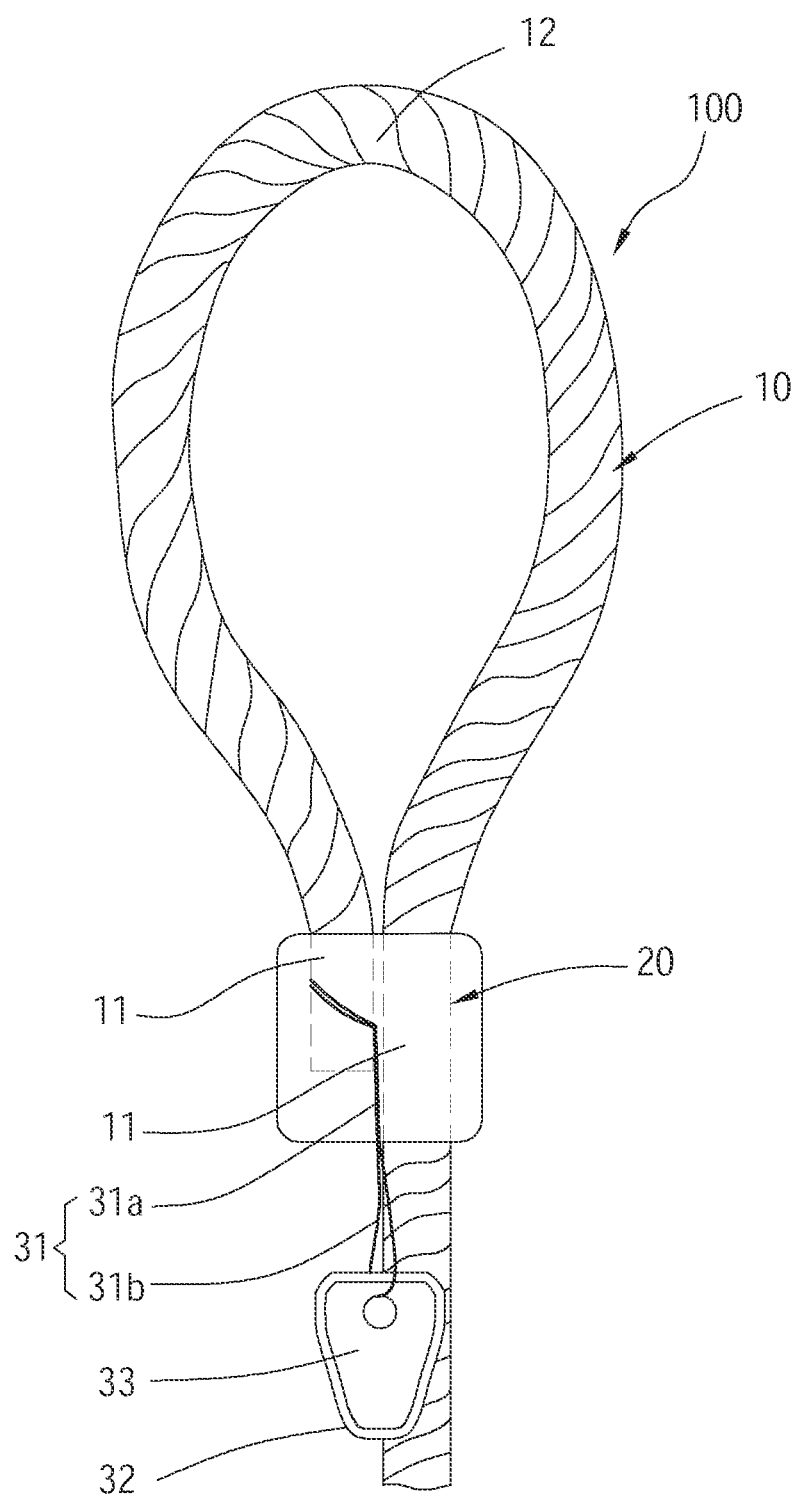
FIG. 2 is a schematic view showing the connecting thread connected to one of the fixed segments in the fixing sleeve according to the first embodiment.

A mooring rope 100 according to a first embodiment of the present disclosure is shown in FIG. 1 and FIG. 2 The mooring rope 100 includes a rope body 10, a fixing sleeve 20, and a data carrier 30.

The rope body 10 has two fixed sections 11 and a rope loop 12 between two fixed sections 11. In the present embodiment, the fixing sleeve 20 is a hollow cylindrical part made of aluminum. After the rope body 10 passes through the fixing sleeve 20, an external force is applied to the fixing sleeve 20, which makes an inner wall of the fixing sleeve 20 fit snugly against the two fixed segments to form the rope loop 12.

The data carrier 30 includes a connecting piece, a main body 32, and a tag member 33. The connecting piece is a connecting thread 31 having a first segment 31a and a second segment 31b. The first segment 31a is wound around at least one of the two fixed segments 11 and is fixed by the fixing sleeve 20. The second segment 31b is located outside the fixing sleeve 20 and is connected to the main body 32. In other embodiments, the first segment 31a may be wound around the two fixed sections 11. Thus, the main body 32 is fixed firmly on the rope body 10 through the connecting piece and will not fall off easily. In addition, the connecting thread 31 does not rub against the rope body 10, so the connecting thread 31 will not break easily.

The tag member 33 is mounted on the main body 32 and stores information of a corresponding object, such as the type, mechanical properties, manufacturer, date of manufacture, working load limit, service life, and maintenance history, etc. for an external data reader (not shown) to read in a non-contacting manner.

Additionally, in an embodiment, the information stored in the tag member 33 may be a code. After reading the code, the data reader retrieves the data from a database according to the code for getting the information of the corresponding object.

In the present embodiment, the tag member 33 is a passive RFID (Radio Frequency Identification) tag, and the data reader is a RFID reader. A user can use the RFID reader to read and receive the information stored in the RFID tag. The information stored in the tag member 33 can be revised and resaved. For example, after the maintenance of the corresponding object is completed, the corresponding information in maintenance history can be updated in the tag member 33.

Moreover, in other applications, the tag member 33 is not limited to the passive RFID tag and may be a semi-passive RFID tag or an active RFID tag. Though, in still other applications, the tag member 33 is not limited to the examples given above and may be other kinds of tag, such as a NFC tag, a NFC Ferrite Tag, an one-dimensional barcode, a two-dimensional barcode, etc. Furthermore, the tag member 33 is disposed inside the main body 32 to prevent the tag member 33 from being fouled, in which the main body 32 plays a protective role. However, in other applications, the position of the tag member is not limited to those described above, and, for example, the tag member 33 may be mounted on an external surface of the main body 32.

Figure 3:
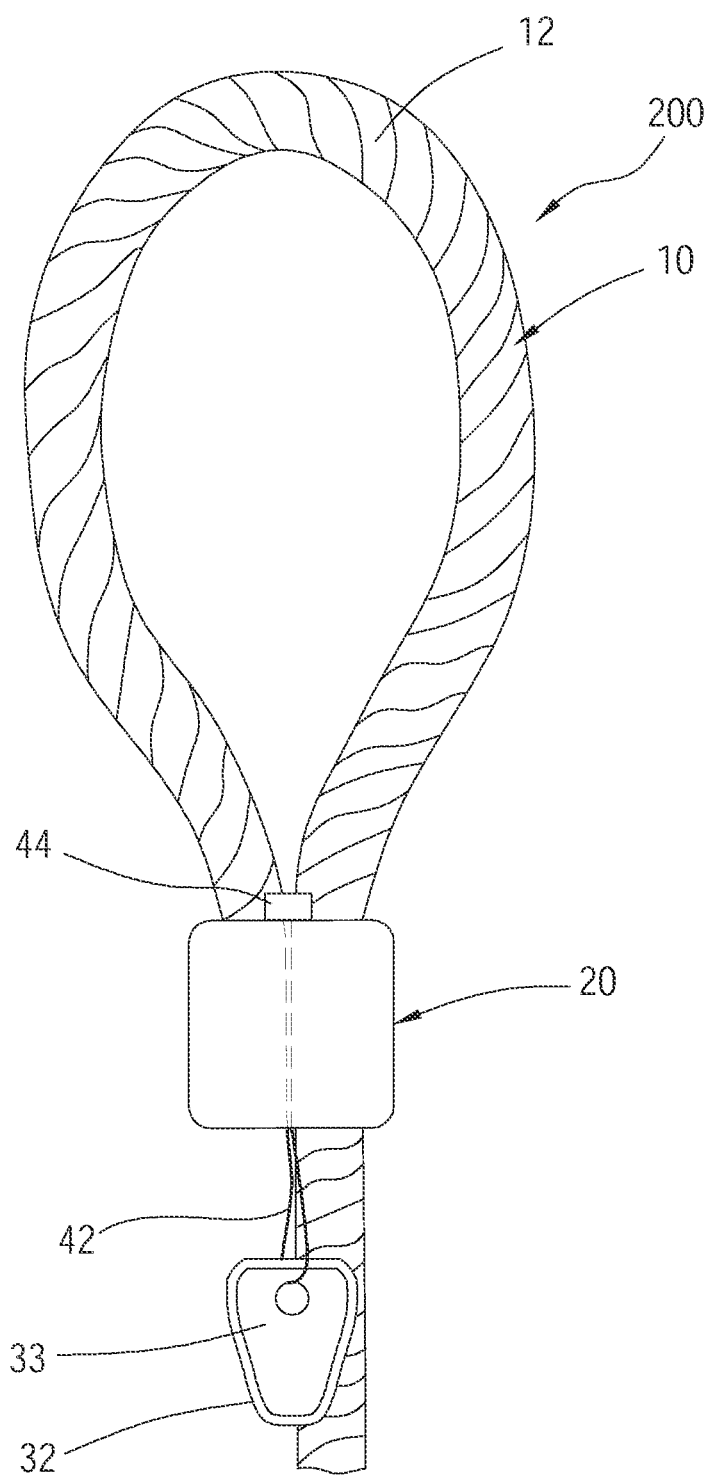
FIG. 3 is a schematic view showing the mooring rope according to a second embodiment of the present disclosure.

Referring to FIG. 3, in a second embodiment, the mooring rope 200 has the same rope body 10, fixing sleeve 20, main body 32 of the data carrier 30, and tag member 33 as the mooring rope 100 in the first embodiment, except that the connecting piece of the mooring rope 200 includes a connecting thread 42 and a thread end 44. The connecting thread 42 has a first segment and a second segment. The thread end 44 is connected with an end of the first segment. The second segment is located outside the fixing sleeve 20 and is connected with the main body 32. The thread end 44 passes through the fixing sleeve 20 and then is fixed to an external surface of the fixing sleeve 20 facing the rope loop 12. The longest width of the thread end 44 is more than the diameter of the connecting thread 42. Thus, when an external force is exerted on the fixing sleeve 20, and then the inner wall of the fixing sleeve 20 tightly compresses the two fixed sections 11, the thread end 44 gets stuck at said external surface of the fixing sleeve 20 so as to fix the main body 32 on the rope body 10 without loosening easily. Furthermore, the connecting thread 42 does not rub against the rope body 10 so that the connecting thread 42 will not be broken easily.

Figure 4:
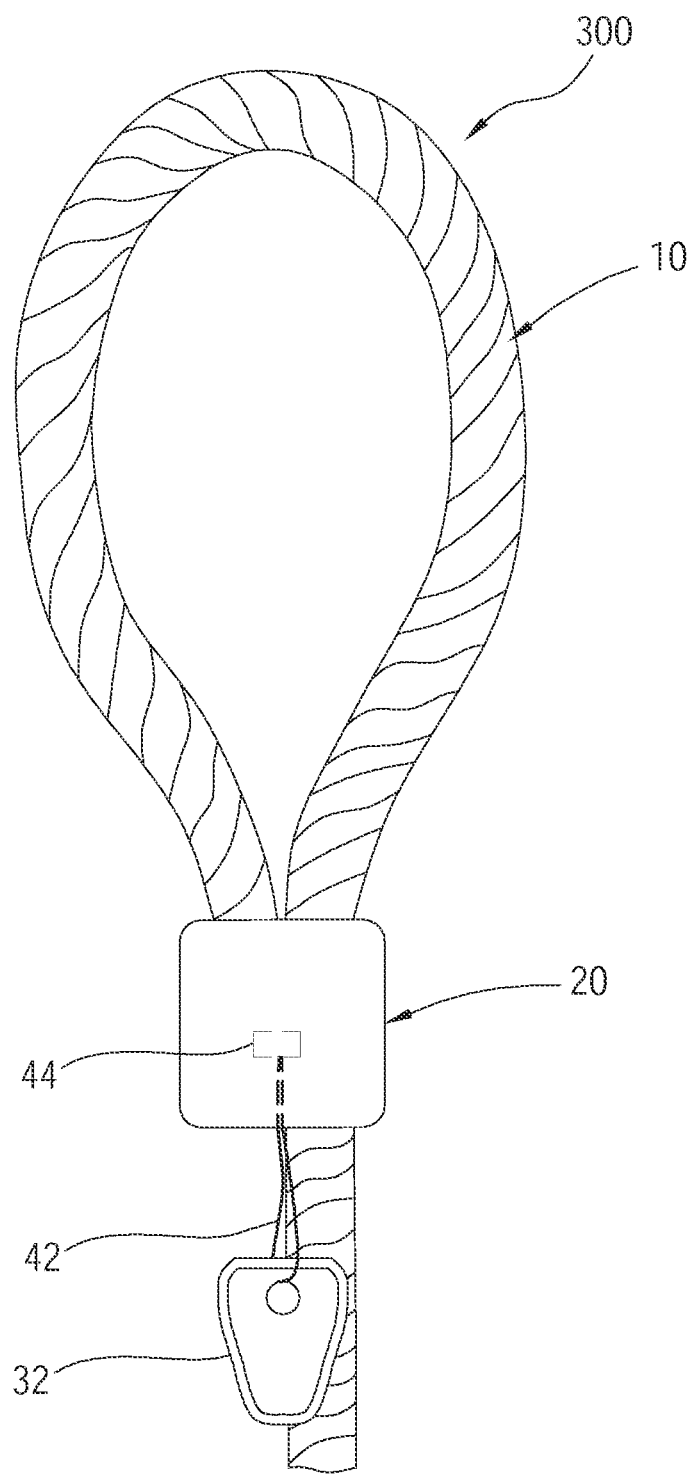
FIG. 4 is a schematic view showing the mooring rope according to a third embodiment of the present disclosure.

Referring to FIG. 4, in a third embodiment, the mooring rope 300 has the same rope body 10, fixing sleeve 20, and data carrier 30 as the mooring rope 200 in the second embodiment, except that the thread end 44 is fixed in the fixing sleeve 20, and as shown in FIG. 5, the thread end 44 can be embedded in the inner wall of the fixing sleeve 20, which increases the contact area of the connecting piece and the fixing sleeve 20 thereby firmly fixing the main body 32 on the rope body 10 without loosening easily. Also, the connecting thread 42 does not rub against the rope body 10 so that the connecting thread 42 will not be broken easily.

According to the aforementioned design, the data carrier of the present disclosure is connected to the fixing sleeve by the connecting piece, the main body can be firmly fixed on the rope body, and it effectively avoids the data carrier to fall off.

It must be pointed out that the embodiments described above are only some embodiments of the present disclosure. All equivalent structures which employ the concepts disclosed in this specification and the appended claims should fall within the scope of the present invention.

What is claimed is:

1. A mooring rope, comprising:
   a rope body having two fixed sections and a rope loop between the two fixed sections;
   a fixing sleeve combining the two fixed sections to fix the rope loop;
   a data carrier including a connecting piece, a main body, and a tag member, wherein the connecting piece is arranged in the fixing sleeve; the main body is connected to the connecting piece; and the tag member is mounted on the main body and stores information for an external data reader to read in a non-contacting manner;
   wherein the connecting piece includes a connecting thread and a thread end; a maximum width of the thread end is greater than a diameter of the connecting thread; the thread end is fixed by the fixing sleeve.

2. The mooring rope as claimed in claim 1, wherein the connecting piece includes a connecting thread having a first segment and a second segment; the first segment is fixed in the fixing sleeve; and the second segment is located outside the fixing sleeve and is connecting to the main body.

3. The mooring rope as claimed in claim 2, wherein the first segment is wound around at least one of the two fixed section.

4. The mooring rope as claimed in claim 1, wherein the connecting thread has a first segment and a second segment; the first segment is connected to the connecting thread; and the second segment is located outside the fixing sleeve and is connected to the main body.

5. The mooring rope as claimed in claim 4, wherein the thread end is embedded in an inner wall of the fixing sleeve.

6. The mooring rope as claimed in claim 1, wherein the fixing sleeve has a surface facing the rope loop; the thread end is located outside the surface; the connecting thread has a first segment and a second segment; the first segment is connected with the thread end and goes into the fixing sleeve; and the second segment is located outside the fixing sleeve and is connected to the main body.

7. The mooring rope as claimed in claim 1, wherein the connecting piece is abutted against an inner wall of the fixing sleeve.

* * * * *